United States Patent Office 3,448,105
Patented June 3, 1969

3,448,105
BASIC ESTERS OF MALONIC ACID
Rudolf G. Griot, Florham Park, N.J., assignor to
Sandoz Inc., Hanover, N.J.
No Drawing. Filed June 7, 1966, Ser. No. 555,822
Int. Cl. A61k *27/00;* C07d *87/50, 31/34*
U.S. Cl. 260—246                                6 Claims

ABSTRACT OF THE DISCLOSURE

The compounds are basic di-esters of bis-(p-chlorophenoxy)malonic acid, e.g., bis-(p-chlorophenoxy)malonic acid β-diethylaminoethyl di-ester, and are useful as hypocholesteremics/hypolipemics.

---

This invention relates to derivatives of malonic acid. In particular, the invention is concerned with basic esters of bis-(substituted)malonic acids and processes for preparing the same. The invention also relates to intermediates which are useful in preparing the above compounds and processes for preparing said intermediates.

The basic esters of the present invention may be represented structurally as follows:

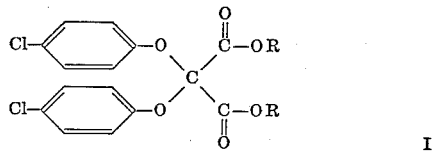

wherein R represents $-(CH_2)_nR'$; 1-lower alkyl-4-piperidyl, the lower alkyl substituent preferably containing from 1 to 4 carbon atoms, e.g., 1-methyl-4-piperidyl and 1-ethyl-4-piperidyl; or 1-lower alkyl-3-piperidyl, the lower alkyl substituent preferably containing from 1 to 4 carbon atoms, e.g., 1-methyl-3-piperidyl and 1-ethyl-3-piperidyl.

R' represents pyrrolidino; piperidino; morpholino; or di-(lower)alkylamino, the lower alkyl substituents being the same or different and each preferably containing from 1 to 4 carbon atoms, e.g., dimethylamino, diethylamino and N-methyl-N-ethylamino; and $n$ represents 2 or 3.

The compounds represented by Formula I are prepared by reacting bis-(p-chlorophenoxy)malonic acid with an inorganic acid halide to form the corresponding bis-(p-chlorophenoxy)malonyl halide and then reacting the latter with an appropriate alcohol or the sodium salt thereof. This process may be illustrated as follows:

wherein R is as defined above and X represents chlorine or bromine.

Step 1 of the process is preferably carried out in an inert, anhydrous organic solvent and at an elevated temperature of up to about 50° C. However, the reaction can be carried out in the absence of a solvent or at room temperature but the use of such conditions will adversely affect the yield of the desired malonyl halide (II). Where a solvent is employed, the choice thereof is not critical and any inert solvent in which the malonic acid is soluble can be used. Suitable solvents include diethyl ether, tetrahydrofuran and dioxane and of these diethyl ether is preferred. The inorganic acid halide employed is preferably thionyl chloride although other conventional acid halides commonly employed in reactions of this nature can also be used. Illustrative of these are thionyl bromide and the phosphorus containing acid halides, e.g., phosphorus trichloride and phosphorus oxychloride, the latter however, are not as practical as the thionyl halides. To facilitate the reaction, a catalyst such as dimethylformamide may be employed. The resulting malonyl halide (II) is readily recovered in conventional manner.

In Step 2 of the process the malonyl halide (II) is reacted with the appropriate alcohol or sodium salt thereof to form the corresponding basic ester of Formula I. This reaction is carried out in conventional manner at room temperature (20° C.) or below employing any suitable inert organic solvent, e.g., benzene, toluene, xylene and the like, as the reaction medium. The reaction, if desired, can be carried out at elevated temperatures. However, in such instances external cooling should be provided since the reaction is highly exothermic. Preferably, the reaction is carried out at a temperature of from about —10° C. to about 5° C. Where the reaction is carried out employing the free alcohol rather than its sodium salt, it is desirable to provide a means for taking up the liberated hydrogen halide. This can be accomplished by carrying out the reaction in the presence of an alkali metal carbonate, e.g., potassium carbonate, or by employing a basic organic solvent, e.g., pyridine, as the reaction medium. The thus-obtained esters can be readily recovered employing conventional techniques.

The bis-(p-chlorophenoxy)malonic acid employed in Step 1 of the process is prepared as described in Example 1 hereinafter. Various of the alcohols employed in Step 2 are known and can be prepared as described in the literature. Such others which are not specifically disclosed in the literature can be prepared from available materials in analogous manner. The sodium salts of the alcohols can be prepared in conventional manner.

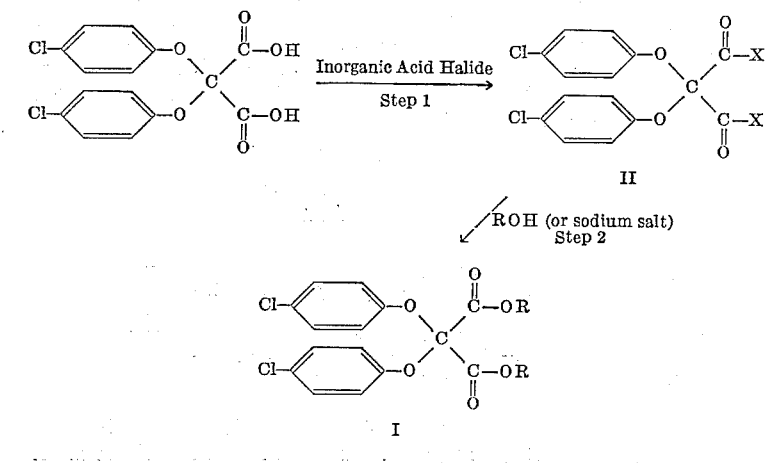

The compounds of Formula I are useful because they possess pharmacological activity. In particular, the compounds are useful as hypocholesteremics/hypolipemics. For such usage the compounds may be admixed with conventional pharmaceutical carriers, and other adjuvants, if necessary, and administered orally in such forms as tablets, capsules, elixirs, suspensions or solutions. The compounds may be administered in their free base form or in the form of a pharmaceutically acceptable acid addition salt thereof. Such salts possess the same order of activity as the free base, are readily prepared by reacting the base with the appropriate acid in conventional manner and accordingly are included within the scope of this invention. Representative of such salts are the mineral acid salts, such as the hydrochloride, hydrobromide, phosphate sulfate and the like, and the organic acid salts, such as the tartrate, benzoate, acetate, methanesulfonate, benzenesulfonate, toluenesulfonate and the like. The dosage administered will, of course, vary depending on the compound employed. However, in general, satisfactory results are obtained when administered at a daily dosage of from about 1 gram to about 2 grams, preferably given in divided doses throughout the day or in sustained release form. A representative formulation suitable for oral administration is a tablet prepared by standard tabletting techniques and containing by weight, 50 parts of bis-(p-chlorophenoxy)malonic acid di-($\beta$-piperidinoethyl)ester, 2 parts of tragacanth, 39.5 parts of lactose, 5 parts of corn starch, 3 parts of talcum and 0.5 part of magnesia stearate.

The following examples show representative compounds contemplated by this invention and the manner in which such compounds are made. However, it is to be understood that the examples are intended for purposes of illustration only and are not intended as in any way limiting the scope of the invention which is defined in the appended claims.

EXAMPLE 1

Bis-(p-chlorophenoxymalonic acid $\beta$-diethylaminoethyl di-ester

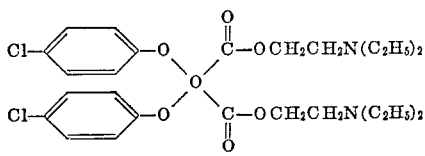

Step A. Preparation of bis-(p-chlorophenoxy)malonic acid diethyl ester 43.3 g. (1.0 mole) of 56.7% sodium hydride in mineral oil is washed with dry, low boiling petroleum ether and the washed sodium hydride then suspended in 1500 ml. of dimethylacetamide. The suspension is then cooled to 0° C. and 141.4 g. (1.10 moles) of p-chlorophenol is then added to the cooled suspension at such a rate that the temperature thereof does not exceed 10° C. (external cooling with and ice/salt bath being employed as necessary). After all of the p-chlorophenol is added, the mixture is stirred for an additional hour, then the cooling bath is removed and 159 g. (0.5 mole) of diethyldibromomalonate added to the mixture fairly rapidly allowing the temperature to rise to about 32° C. The mixture is stirred for 88 hours and then ¾ of the solvent is evaporated in vacuo. To the resulting concentrate is added 1500 ml. of ethyl acetate and the mixture thus obtained washed twice with 1500 ml. (each) of water and then twice with 750 ml. (each) of 2 N aqueous sodium hydroxide. The washed organic phase is then dried over anhydrous magnesium sulfate, filtered and the solvent evaporated to obtain bis-(p-chlorophenoxy)-malonic acid diethyl ester. Recrystallization from 95% ethanol affords bis-(p-chlorophenoxy)malonic acid diethyl ester, M.P. 48–50° C.

Step B. Preparation of bis-(p-chlorophenoxy)malonic acid

To a mixture of 250 ml. of methanol and 20 ml. of water heated slightly (30° C.) as a water bath is added 16.1 g. (0.05 mole) of barium hydroxide. To the resulting practically clear solution is added a solution of 20.65 g. (0.05 mole) of bis-(p-chlorophenoxy)malonic acid diethyl ester in 50 ml. of methanol. The resulting suspension is kept on the water bath for 15 minutes and the solid then filtered off and dried in an oven under high vacuum. The dried solids, 4.92 g., are suspended in 50 ml. of ethanol and a solution of 1.025 g. of concentrated sulfuric acid in 10 ml. of water is added to the suspension. The resulting mixture is agitated for ½ hour, the insoluble material filtered off and the filtrate evaporated at room temperature under high vacuum. The resulting oil is dissolved in 50 ml. of diethyl ether, the ether solution dried over magnesium sulfate and the solvent recovered with a water aspirator. The oil thus obtained is crystallized from ethyl acetate-cyclohexane and the resulting solids recrystallized from ethyl acetate-cyclohexane to obtain bis-(p-chlorophenoxy)malonic acid, M.P. 159–160° C. (dec.).

Step C. Preparation of bis-(p-chlorophenoxy)malonyl chloride

To 106 g. of bis-(p-chlorophenoxy)malonic acid dissolved in 250 ml. of dry diethyl ether is added 65 ml. of thionyl chloride and 2 ml. of dimethylformamide. The mixture is refluxed for 4 hours and then the solvent and excess thionyl chloride evaporated at 40° C. under reduced pressure. Dry carbon tetrachloride, 100 ml., is then added and the resulting solution filtered and then evaporated at 40° C. under reduced pressure to yield bis-(p-chlorophenoxy)malonyl chloride as a viscous oil which crystallized slowly upon standing at room temperature. The crude crystalline material is washed with cold dry pentane and dried overnight at 20° C./0.1 mm. to yield analytically pure bis-(p-chlorophenoxy)malonyl chloride, M.P. 63–66° C., B.P. 154° C./0.15 mm.

Step D. Preparation of bis-(p-chlorophenoxy)malonic acid $\beta$-diethylaminoethyl di-ester To a solution of 51 g. (0.436 mole) of $\beta$-diethylaminoethanol in 100 ml. of toluene cooled to —10° C. is added dropwise a solution of 50 g. (0.127 mole) of bis-(p-chlorophenoxy) malonyl chloride in 100 ml. of toluene while maintaining the temperature of the mixture between —10° to 5° C. by external cooling. After the addition is completed, the mixture is allowed to reach room temperature, then filtered and the filtrate concentrated in vacuo. The resulting oil is then poured onto ice-water and the resultant extracted three times with 200 ml. (each) of benzene. The organic phase is dried over magnesium sulfate, evaporated in vacuo to yield crude bis-(p-chlorophenoxy) malonic acid $\beta$-diethylaminoethyl di-ester as the free base. The base is dissolved in 150 ml. of dry diethyl ether and the resulting solution treated with an excess of hydrogen chloride gas. Dry acetone 300 ml., is then added and the precipitated salt filtered off and recrystallized from 1 liter of hot acetone to yield the dihydrochloride salt of bis-(p-chlorophenoxy)malonic acid $\beta$-diethylaminoethyl di-ester, M.P. 144–145° C.

EXAMPLE 2

Bis-(p-chlorophenoxy)malonic acid $\beta$-morpholinoethyl di-ester

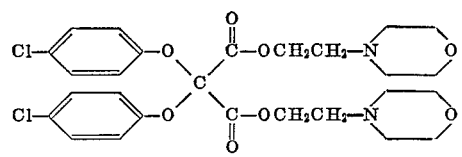

Following the procedure of Step D of Example 1 and employing an equivalent amount of $\beta$-morpholinoethanol in place of the β-diethylaminoethanol used therein, there is obtained bis-(p-chlorophenoxy)malonic acid β-morpholinoethyl di-ester as the free base. The dihydrochloride salt thereof, M.P. 201° C., is obtained in the same manner as set forth in Step D of Example 1 except that the salt is recrystallized from isopropanol.

EXAMPLE 3

Bis-(p-chlorophenoxy)malonic acid 1-methyl-4-piperidyl di-ester

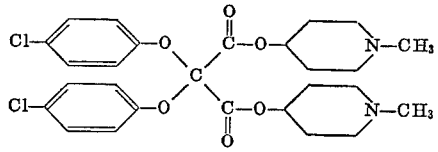

Following the procedure of Step D of Example 1 and employing an equivalent amount of 1-methyl-4-hydroxypiperidine in place of the β-diethylaminoethanol used therein, there is obtained bis-(p-chlorophenoxy)malonic acid 1-methyl-4-piperidyl di-ester as the free base. The dihydrochloride salt thereof, M.P. 257° C. (dec.), is obtained in the same manner as set forth in Step D of Example 1 except that the salt is recrystallized from methanoldiethyl ether.

EXAMPLE 4

Bis-(p-chlorophenoxy)malonic acid β-piperidinoethyl di-ester

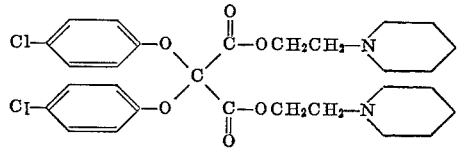

N-β-hydroxyethylpiperidine, 12.9 g., and 2.3 g. of sodium are heated together for five hours at reflux temperature and then 100 ml. of toluene is added and the mixture cooled to 0° C. A solution of 23.8 g. of bis-(p-chlorophenoxy)malonyl chloride in 70 ml. of toluene is then added dropwise maintaining the temperature of the mixture at 0 to 5° C. After the addition is completed, the mixture is allowed to stand overnight at room temperature and then poured onto ice-water containing 50 ml. of 2 N aqueous sodium hydroxide. The organic layer is then washed with two 100 ml. portions of water, dried over magnesium sulfate and evaporated to obtain bis-(p-chlorophenoxy)malonic acid β-piperidinoethyl di-ester as an oil. The latter is then treated with an isopropanolic solution of hydrogen chloride and the resulting salt recrystallized from acetone-diethyl ether to yield the dihydrochloride salt of bis-(p-chlorophenoxy)malonic acid β-piperidinoethyl di-ester, M.P. 173° C.

EXAMPLE 5

Bis-(p-chlorophenoxy)malonic acid β-pyrrolidinoethyl di-ester

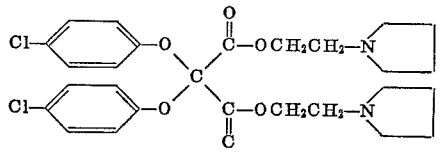

Following the procedure of Example 4 and employing an equivalent amount of N-β-hydroxyethylpyrrolidine in place of the N-β-hydroxyethylpiperidine used therein, there is obtained bis-(p-chlorophenoxy)malonic acid β-pyrrolidinoethyl di-ester as the free base. The dihydrochloride salt thereof, M.P. 174–175° C., is obtained in the same manner as set forth in Example 4 except that the salt is recrystallized from acetone.

What is claimed is:

1. A compound selected from the group consisting of malonic acid esters of the formula and pharmaceutically acceptable acid addition salts thereof, wherein
R represents—$(CH_2)_nR'$, 1-[lower]alkyl-4-piperidyl having from 1 to 4 carbon atoms in the alkyl substituent, or 1-[lower]alkyl-3-piperidyl having from 1 to 4 carbon atoms in the alkyl substitutent;
R' represents pyrrolidino, piperidino, morpholino or di[(lower)]alkylamino the alkyl substituents of which are the same or different and each containing from 1 to 4 carbon atoms; and
$n$ represents 2 or 3.

2. The compound of claim 1 which is bis-(p-chlorophenoxy)malonic acid β-diethylaminoethyl di-ester.

3. The compound of claim 1 which is bis-(p-chlorophenoxy)malonic acid β-pyrrolidinoethyl di-ester.

4. The compound of claim 1 which is bis-(p-chlorophenoxy)malonic acid β-piperidinoethyl di-ester.

5. The compound of claim 1 which is bis-(p-chlorophenoxy)malonic acid β-morpholinoethyl di-ester.

6. The compound of claim 1 which is bis-(p-chlorophenoxy)malonic acid 1-methyl-4-piperidyl di-ester.

References Cited

UNITED STATES PATENTS 2,711,424    6/1955    Suter et al. _____ 260—473

ALEX MAZEL, Primary Examiner.

JOSE TOVAL, Assistant Examiner.

U.S. Cl. X.R.

260—294.3, 236.3, 473; 424—308, 248, 263, 267, 274